E. A. RIOTTE.
MARINE PROPELLER.
APPLICATION FILED SEPT. 14, 1916.
1,267,117.
Patented May 21, 1918.
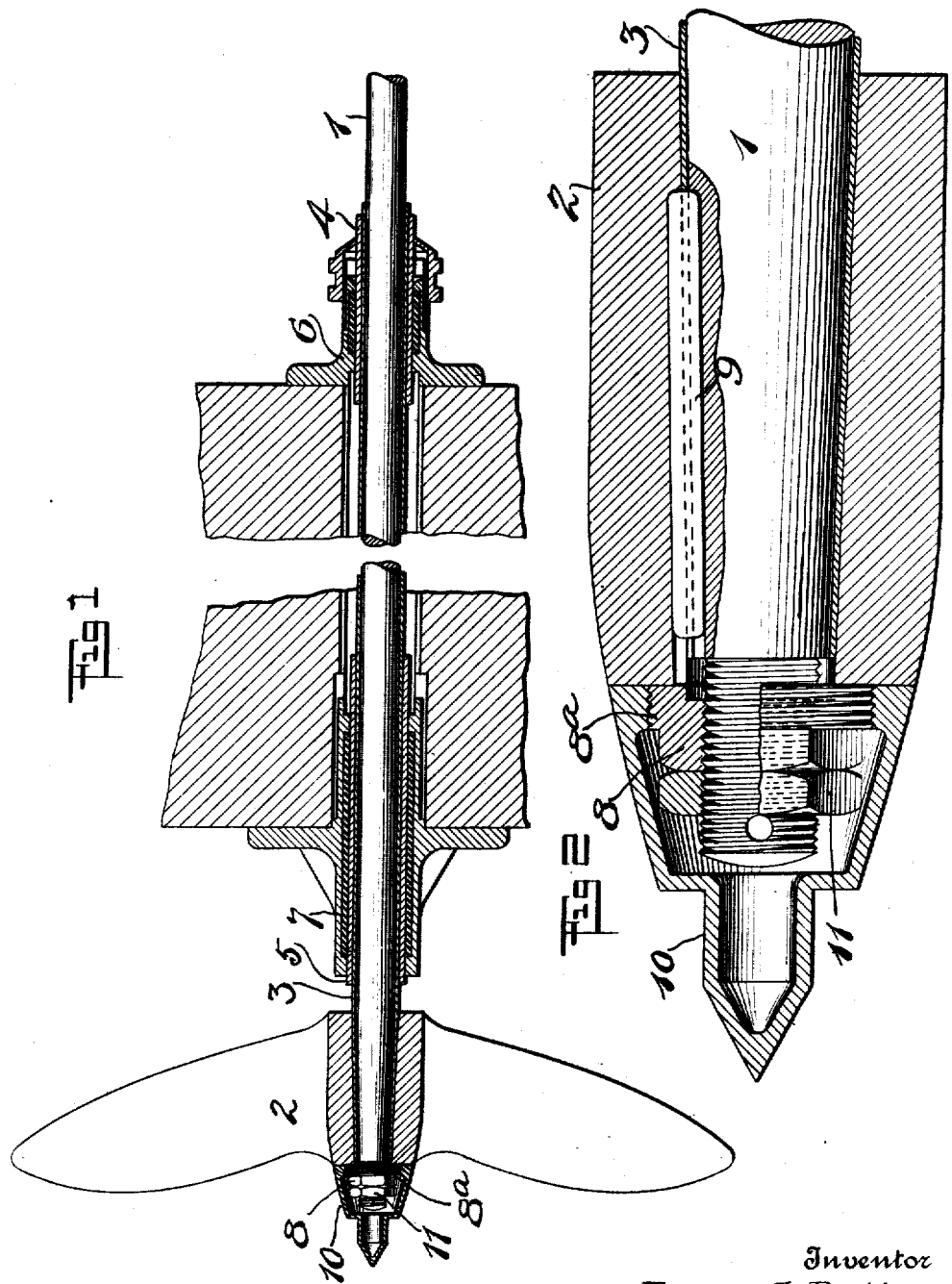
Inventor
Eugene A. Riotte
By his Attorneys

UNITED STATES PATENT OFFICE.

EUGENE A. RIOTTE, OF DOUGLASTON, NEW YORK, ASSIGNOR TO STANDARD MOTOR CONSTRUCTION COMPANY, OF JERSEY CITY, NEW JERSEY, A CORPORATION OF NEW JERSEY.

MARINE PROPELLER.

1,267,117. Specification of Letters Patent. Patented May 21, 1918.

Application filed September 14, 1916. Serial No. 120,007.

*To all whom it may concern:*

Be it known that I, EUGENE A. RIOTTE, a citizen of the United States of America, residing at Douglaston, Queens county, New York, have invented a new and useful Marine Propeller, of which the following is a specification.

My invention relates to certain new and useful improvement in propeller shafts, and aims to provide a shaft of minimum weight and size and maximum strength. Another aim is to provide a construction which will effectively resist corrosion, and which will also improve the connection between the shaft and the propeller.

In the accompanying drawings:

Figure 1 is a longitudinal section view of a propeller shaft, the core thereof being shown in elevation, said view also illustrating the shaft bearings and a propeller, mounted as in use.

Fig. 2 is a relatively enlarged view of the end of the shaft with a propeller hub mounted thereon.

1 represents the main body, or core of the shaft which is preferably made of steel so as to afford the maximum of strength. The outer end of this core is tapered so as to receive the hub of a propeller 2, the bore of said hub being tapered to correspond to the tapered end of the shaft. That part of the shaft 1 that passes through the bearings and which engages in the tapered bore of the propeller and which spans the space between the outboard bearing and said propeller, is completely covered with a copper or copper alloy jacket or sleeve which is applied thereto in such a manner as to be a permanent part of the shaft. This jacket or sleeve is indicated at 3. 4—5 are bushings preferably of a copper alloy sufficiently hard to properly resist wear, which bushings are rigidly secured on to those parts of the shaft which engage in the shaft bearings. In this case two bearings are used, 6 representing the inboard bearing and 7 representing the outboard bearing. The propeller 2 may be forced into place by means of a set-up nut 8 which is threaded upon the outboard end of the shaft 1 and which set-up nut has a shoulder 8ª which bears against the end of the propeller hub so that when the nut 8 is screwed up it will force the hub tightly on to the tapered end of the shaft. 9 is a key which may also be employed between the shaft end and the propeller hub. 10 is a cap which is designed to cover and protect the set-up nut and the threaded end of the shaft. In this instance the cap 10 is threaded on to the shouldered portion 8ª of the nut 8, and when set-up tightly against the hub, forms a water-tight connection for the aforesaid protective purposes. 11 is the usual lock nut that may be employed, if desired. By covering the shaft 1 with a relatively soft non-corrosive metal, and by extending said covering throughout the length of the tapered portion upon which the propeller hub is mounted, I have found that a most effective connection may be secured between said propeller and the shaft, since that part of the jacket 3 which covers the tapered end of the shaft forms a highly effective seat to receive the hub of the propeller. It should be understood of course, that the propeller 2 and cap 10 are of brass or a suitable copper alloy which will resist corrosion, hence, when the parts are assembled, as shown in the drawings, I am enabled to secure the greatest efficiency.

Any method may be resorted to for applying the copper covering or jacket to the core 1 of the shaft so long as such method will effect a permanent union between the core and its jacket. Obviously, the jacket need not extend throughout the entire length of the core 1, although it is preferable that it should extend to a point forward of the inboard bearing, as shown in the drawings.

It is preferred that the bushings should be shrunk upon the shaft, since that method avoids all danger of cracking open the connection of said parts through the strain upon and vibrations of the shaft. Furthermore, by shrinking said bushings in place, the same operate to additionally hold the copper jacket on the shaft, whereas if the bushings were merely braced in place, the frictional strain of the bushings running in the bearings, would to some extent tend to loosen the jacket. By this improvement this danger is avoided.

What I claim is:

1. In a device of the character described, a propeller shaft including a core of steel having a tapered end, a jacket of relatively soft and relatively non-corrosive material of substantially uniform thickness permanently united to said core to completely cover the same throughout a substantial portion of its length including said tapered end to form a seat for a propeller hub.

2. In a device of the character described, a propeller shaft including a core of steel having a tapered end, a jacket of relatively soft and relatively non-corrosive material united to said core to completely cover the same throughout a substantial portion of its length including said tapered end, a relatively hard wear resisting bushing rigidly united to said shaft forward of said tapered end, said wear resisting bushing being formed of relatively non-corrosive metal.

3. In a device of the character described, a propeller shaft including a core of steel having a tapered end, a jacket of relatively soft and relatively non-corrosive material united to said core to completely cover the same throughout a substantial portion of its length including said tapered end, a propeller, the hub of which has a bore tapered to correspond with the tapered end of said shaft, a threaded extension on the core of said shaft beyond the tapered end and a set-up nut mounted thereon and arranged to bear against said propeller hub to force the same on to the tapered end of the shaft, and a removable protecting cap arranged to overstand said threaded shaft end and nut.

4. A propeller shaft including a core of ferrous material having a tapered outer end and a screw threaded tip, a jacket of relatively soft and relatively non-corrosive metal of substantially uniform thickness substantially covering said core throughout a substantial portion of its length including said tapered portion to form at said tapered portion a seat for a propeller hub and to form a continuous protective covering from a point on the tapered portion of the core to a point forward of the rear end of the outer bearing for the shaft.

5. A propeller shaft including a core of ferrous material having a tapered outer end and a screw threaded tip, a seamless jacket of relatively soft and relatively non-corrosive metal of substantially uniform thickness substantially covering said core throughout substantially covering said core throughout a substantial portion of its length including said tapered portion to form at said tapered portion a seat for a propeller hub the forward part of said sleeve being sufficiently long to protect and cover that part of the core between the shaft bearing and the propeller from contact with water when in use.

6. A propeller shaft including a core of ferrous material having a tapered outer end and a screw threaded tip, a jacket of relatively soft and relatively non-corrosive metal of substantially uniform thickness substantially covering said core throughout a substantial portion of its length including said tapered portion to form at said tapered portion a seat for a propeller hub, and a bushing of non-corrosive and relatively harder material than said jacket surrounding and rigidly united to said jacket forward of said tapered portion.

7. A propeller shaft including a core of ferrous metal having a tapered end, a jacket comprising a plurality of sleeves of relatively soft non-corrosive material, one of said sleeves extending throughout substantially the entire length of the tapered portion to form a seat for a propeller hub.

8. A propeller shaft including a core of ferrous metal, a jacket of relatively soft non-corrosive metal permanently united thereto to completely cover and protect the same throughout a substantial portion of its length, the outer end of said jacket constituting an internal seat for a propeller hub.

9. A propeller shaft including a core of ferrous metal, a jacket of relatively soft non-corrosive metal permanently united thereto to protect the same throughout a substantial portion of its length, the outer end of said jacket constituting an internal seat for a propeller hub, said seat being tapered.

10. In a device of the character described, a propeller shaft including a core of ferrous metal having a tapered portion, a relatively non corrosive metal alloy jacket united to said core to completely cover the same throughout a substantial portion of its length including said tapered portion, a propeller comprising a bearing portion of substantially similar material, the hub of which is adapted to be mounted on said tapered portion, means to retain said hub in position against displacement, and an independent protective covering for said means.

11. In combination, a bearing, a propeller shaft comprising a core of ferrous material passing through said bearing and supported thereby, the outer end of said core being tapered, a tubular jacket covering a substantial portion of said shaft including a sufficient portion of the tapered end to form a propeller seat and a sufficient portion of that part of the shaft within said bearing to safeguard the core from the corroding attack of water, and also completely covering all of that part of the shaft between said bearing and the propeller seat, a keyway formed in the tapered part of the seat and arranged to receive a key and to be completely covered by the hub of the propeller when the latter is in place, and means carried by the core for holding a propeller against longitudinal movement on the shaft, and a propeller having a bore tapered to seat on the tapered end of the shaft, part of said bore having a key slot beginning at a point to the rear of the forward end of the propeller hub, all arranged whereby when the bearing shaft and propeller are in place for operation the ferrous core will be completely protected from contact with water.

12. The combination in a propeller shaft of a ferrous core comprising a propeller hub receiving portion having a key-way therein, a bearing portion, an intermediate connecting portion, a jointless relatively non corrosive metal covering integrally united to and entirely surrounding said shaft, with the exception of a key-way portion, from a point at or near the end of shaft, to a point forward of the bearing portion, a propeller comprising a hub of substantially similar material to said covering, wear resisting bearing sleeves mounted on said covering at the bearing portion of said shaft, means to secure said propeller in position against longitudinal displacement, and means to protect said shaft end from corrosion.

13. In a device of the character described, a propeller shaft including a core of ferrous material having a tapered propeller receiving end, a seamless jacket of relatively non-corrosive metal covering all parts of said core exposed to the attack of water and projecting over a sufficient portion of the tapered end to form a tapered seat for a propeller hub.

14. In a device of the character described, a propeller shaft including a core of ferrous material having a tapered propeller receiving end, a seamless jacket of relatively non-corrosive metal covering all parts of said core exposed to the attack of water and projecting over a sufficient portion of the tapered end to form a tapered seat for a propeller hub, and a wear resisting sleeve of relatively hard non-corrosive material secured on said jacket forward of the tapered portion.

15. A propeller shaft for vessels comprising a core of ferrous metal having a tapered rear end, a jacket of non-corrosive metal permanently secured to and covering that part of the shaft exposed to water when in use, said jacket extending rearwardly over a substantial portion of the tapered part of said core to form a seat of the hub of a propeller, and forwardly over a substantial portion of that part of the shaft adapted to project into the vessel.

EUGENE A. RIOTTE.

Copies of this patent may be obtained for five cents each, by addressing the "Commissioner of Patents, Washington, D. C."